ELECTRICAL NETWORK FOR ECHO CORRECTION IN ELECTRICAL SIGNALING SYSTEMS

Filed Oct. 13, 1948

INVENTOR
DENNIS CLARK ESPLEY
BY John A. Harvey
ATTORNEY

Patented May 20, 1952

2,597,781

UNITED STATES PATENT OFFICE 2,597,781

ELECTRICAL NETWORKS FOR ECHO CORRECTION IN ELECTRICAL SIGNALING SYSTEMS

Dennis Clark Espley, North Wembley, England, assignor to The General Electric Company, Limited, London, England Application October 13, 1948, Serial No. 54,293
In Great Britain May 2, 1947

8 Claims. (Cl. 178—44)

Figure 1:
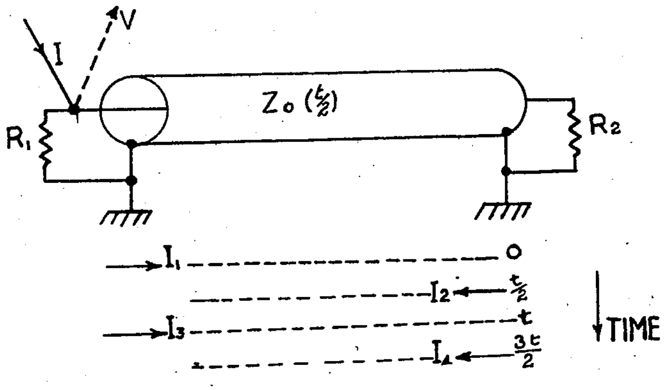

The present invention relates to electrical wave-form correcting networks and to electrical signalling system incorporating such networks for the correction of echo signals, such as may be produced in radio-relay links or in co-axial cables. In such systems it may be found after installation of a receiver that there is picked up from the associated transmitter not only the desired direct signal but also an echo signal which has been reflected from some object or discontinuity and has, therefore, followed a different path from the direct signals. Since the path length of the echo will be longer than that of the direct signal the echo will be delayed in time relatively to the direct signal and the result will often be objectionable.

The term "echo signal" is intended to include both signals which are in the nature of true echoes and also other signals having like characteristics. The characteristics of an "echo signal" which the invention is concerned to correct are a wave-form substantially the same as that of a desired signal and of equal or smaller amplitude, and a time delay of the "echo" wave-form relatively to that of the desired signal.

Co-pending application No. 765,736 filed August 2, 1947, Espley et al., for "Radio Signalling Systems," now abandoned, describes certain means which may be adopted for substantially removing, or greatly reducing the amplitude, of such echoes; it is therein shown that the required undistorted signals, or echo-free signal, may be achieved by the electrical addition of wave-form signals, the amplitudes of which are arranged to fit the terms in a geometrical progression and which are progressively related to an increasing time delay. In the said application it is proposed to generate separately the necessary terms of the series by electrically isolated delay lines or networks.

The object of this invention is to provide a network for achieving the same effect with the use of only a single line.

According to the invention a wave-form correcting network comprises a transmission line terminated at one or both ends by impedances which are so dimensioned that an input pulse applied to terminals of the network gives rise to an initial output pulse followed at equal time intervals by a succession of output pulses resulting from reflections between the terminations of the line, the amplitudes of which output pulses are in a geometrical progression of which the amplitude of the initial output pulse constitutes the first term.

In the use of the network in accordance with the invention for the elimination of echo signals, the time delay and terminations of the network are so adjusted that the first reflection output pulse appears simultaneously with the initial output pulse generated by the echo and with such amplitude and phase that the echo pulse is substantially eliminated; the reflection pulses produced by the echo are then automatically eliminated by the succession of second, third, etc. reflection pulses produced by the signal.

The network in accordance with the invention may be used as a two terminal impedance which is fed by the signal current from a source of very much higher impedance so that the required output pulses appear across the same two terminals. In other cases it may be arranged that the signal current is fed to one end of the line so that the output pulses appear across the other end of the line.

Figure 2:
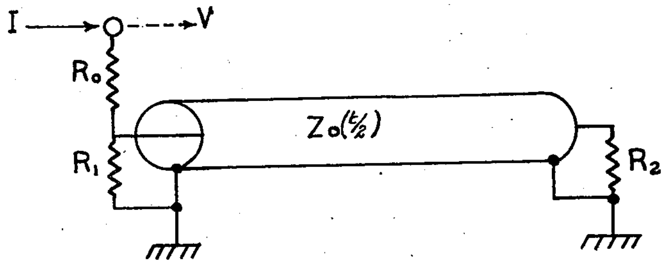
Figure 3:
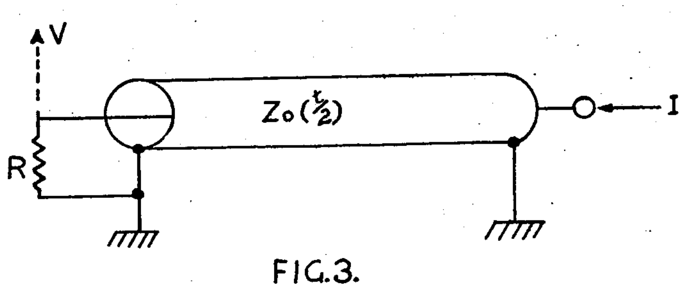

The invention will be further explained with reference to the accompanying drawings in which Figure 1 represents the basic form of two-terminal network from which the invention, in its two-terminal form, starts, and Figures 2 and 3 show a two-terminal and a four-terminal network, respectively, according to the invention.

Referring to Figure 1, if the initial pulse current is I from a source of infinite impedance, then let $V_1$=initial input voltage
$I_1$=initial line input current
$I_2$=initial line reflected current
$V_2$=first reflection voltage across input terminals
$I_3$=second current into line Then $$V_1=IR_1Z_0/(R_1+Z_0) \qquad (1)$$

$$I_1=V_1/Z_0=IR_1/(R_1+Z_0) \qquad (2)$$

$$I_2=I_1(R_2-Z_0)/(R_2+Z_0)= IR_1(R_2-Z_0)/(R_1+Z_0)(R_2+Z_0) \qquad (3)$$

$$V_2=I_2.2R_1Z_0/(R_1+Z_0)= IR_1(R_2-Z_0).2R_1Z_0/(R_1+Z_0)^2(R_2+Z_0) \qquad (4)$$

$$I_3=I_2(R_1-Z_0)/(R_1+Z_0) \quad I_1(R_1-Z_0)(R_2-Z_0)/(R_1+Z_0)(R_2+Z_0) \qquad (5)$$

so that $$V_2/V_1=2R_1(R_2-Z_0)/(R_1+Z_0)(R_2+Z_0) \qquad (6)$$

and $$I_3/I_1=(R_1-Z_0)(R_2-Z_0)/(R_1+Z_0)(R_2+Z_0) \qquad (7)$$

The currents $I_1$, $I_2$, $I_3$ and $I_4$ are represented graphically in Figure 1 in their relation to the time $t$, the current at the input at time $t=0$ being $I_1$.

Equation 7 gives the ratio between any reflection voltage and the preceeding reflection voltage (here expressed in terms of currents), but the ratio between the first reflection voltage and the initial input has a different value. For the desired geometric series it would be necessary for $$V_2/V_1=I_3/I_1$$

which requires that $$2R_1=R_1-Z_0$$

which is impossible with positive values of $R_1$ and $Z_0$.

In accordance with the invention the desired condition can be obtained by increasing the initial voltage across the input terminals of the network, relative to the first reflection voltage appearing across the same terminals in the ratio $$2R_1/(R_1-Z_0)$$

For the two-terminal case this may be achieved by the series addition of a resistor $R_0$ in the network as shown in Figure 2, where $R_0$ satisfies the expression $$\frac{R_0+R_1Z_0/(R_1+Z_0)}{R_1Z_0/(R_1+Z_0)}=2R_1/(R_1-Z_0) \quad (8)$$

i. e.

$$R_0=R_1Z_0/(R_1-Z_0) \quad (9)$$

The desired amplitude ratio $k$ of the geometric series is given by:

$$k=\rho_1\rho_2 \quad (10)$$

in which $$\rho_1=(R_1-Z_0)/(R_1+Z_0)$$

is the input reflection coefficient and $$\rho_2=(R_2-Z_0)/(R_2+Z_0) \quad (11)$$

is the far end reflection coefficient.

A useful simplification is introduced if $/\rho_2/=1$, i. e. if the line is open or short circuited at the end away from $R_0$ and $R_1$.

Then $$k=\rho_1=(R_1-Z_0)/(R_1+Z_0) \quad (12)$$

so that $$R_0=R_1Z_0/k(R_1+Z_0) \quad (13)$$

which is represented by $R_1$ in parallel with $Z_0/k$.

From Equation 12 it can be seen that:

$$R_1=Z_0(1+k)/(1-k) \quad (14)$$

Substituting this value for $R_1$ in Equation 13, the value of $R_0$ is then:

$$R_0=Z_0(1+k)/2k \quad (15)$$

It is important to note that if the line has any significant attenuation at the signal frequencies then the reflection factor product $\rho_1\rho_2$ must be increased to maintain the desired value of $I_3/I_1$.

The four terminal network arrangement in accordance with the invention is shown in Figure 3 in which the input current is fed to the open end of the line and the output voltage is derived from the far end termination R; the amplitude of the reflection pulses is now controlled by the value of R and this need only be adjusted to give the required amplitude for elimination of the echo in accordance with the relative amplitudes of the input signal and input echo. In this case R is arranged to be equal to $$Z_0(1+k)/(1-k)$$

The inverse of Figure 3, in which the signal current is fed to the resistively terminated input end of the line and the output voltage is taken from the open circuited far end, may also be used.

Although the transmission line has been described as consisting of a suitable length of concentric cable it may take other forms and may comprise either distributed or lumped impedances.

It is to be understood that the present invention can be applied to signals such as video or audio signals or to a carrier modulated in amplitude, frequency or phase with any suitable modulation. Where a carrier is employed it is to be noted that all non-linear devices such as detectors are assumed to be absent. If non-linear devices are included between the point where the undesired echo signals combine with the desired signal and the point where they are to be removed therefrom, the invention is not always applicable in the manner described.

The difficulty arises from differences in the phases of the carrier waves of the desired and echo signals. A change in the phase of the carrier at a transmitter will be accompanied by an equal change in phase of the echo. However, by a suitable small adjustment of the carrier frequency at the transmitter, as described in the specification of application No. 765,736, owing to the different lengths of path followed by the direct and echo signal, it can be arranged that the present invention serves substantially to eliminate at least one or more echo signals and these may be chosen to be the most objectionable, usually those of greatest amplitude.

What is known as a first detector in a radio receiver is not regarded as a non-linear device in the sense of affecting the application of the invention since its function is merely to change the frequency of a received carrier without modifying the character thereof.

The invention is therefore applicable without difficulty to the intermediate frequency amplifier in radio receiving equipment.

What is known as a second detector which extracts the modulation is, however, a non-linear device calling, in general, for adjustment of the carrier phase.

I claim:

1. A waveform correcting network for reducing the amplitude of an echo signal which is delayed in time by a time $t$ relatively to a desired signal, which is of amplitude not greater than the desired signal and which has a waveform substantially the same as that of the desired signal, the network comprising a transmission line including an input terminal and an output terminal, means for applying said desired and echo signals to said input terminal of said transmission line, means for deriving said desired signal from said output terminal of said transmission line, the time delay between said input and output terminals being equal to $t$, and terminations at both ends of said transmission line which are mismatched to the characteristic impedance of the transmission line to generate reflections of said desired and echo signal at said output terminal, the said terminations and the said means for applying signals to said input terminal being proportioned to generate from said desired signal at the output terminal of said network a succession of signals, produced by said desired signal and by multiple reflections of said desired signal at said terminations, the amplitudes of corresponding points in the waveforms of said succession of signals being in geometrical progression of which said desired signal constitutes the first term, and a signal substantially equal in amplitude to, similar in shape to, and opposite in polarity to said echo signal constitutes the second term.

2. A waveform correcting network for reducing the amplitude of an echo signal relatively to a desired signal of substantially like waveform, the echo signal being delayed in time relatively to the desired signal, said network comprising a transmission line of characteristic impedance $Z_0$, a terminal constituting both an input terminal for the application of said signals and also an output terminal, terminations of resistance $R_1$ and $R_2$ respectively at the ends of said network, said resistances differing from $Z_0$ whereby multiple reflections are produced at both said terminations in response to signals applied to said terminal, and a resistor of value $R_0$ connected between said terminal and the end of said transmission line terminated by the resistance $R_1$, the relations $$R_0 = R_1 Z_0 / (R_1 - Z_0)$$

and $$k = (R_1 - Z_0)(R_2 - Z_0) / (R_1 + Z_0)(R_2 + Z_0)$$

being substantially satisfied, where $k$ is a constant representing the amplitude ratio of the geometrical progression constituted by the amplitudes of pulses generated at said terminal by said desired signal and by the multiple reflections of said desired signal at said terminations.

3. A network according to claim 2, wherein $R_2$ is substantially infinite.

4. A network according to claim 2, wherein $R_2$ is substantially zero.

5. A network according to claim 2, wherein the delay time of said transmission line between the instant of application of an impulse to said terminal and the return of such impulse to said terminal after a single reflection is substantially equal to the time delay of said echo signal relatively to said desired signal.

6. A network according to claim 2, wherein $k$ is substantially equal to the amplitude ratio of said echo signal to said desired signal.

7. A waveform correcting network for reducing the amplitude of an echo signal relatively to a desired signal of substantially like waveform, the echo signal being delayed in time relatively to the desired signal, said network comprising a transmission line of characteristic impedance $Z_0$, input terminals at one end of said transmission line for the application of a current representative of said signals, output terminals at the other end of said transmission line for deriving a voltage representative of said desired signals, a substantially open circuit termination at one end of said transmission line and a termination of resistance R at the other end of said transmission line, said terminations differing from $Z_0$ whereby multiple reflections take place at both said ends in response to current applied to said input terminals, the relation $$R = Z_0(1+k)/(1-k)$$

being substantially satisfied where $k$ is the amplitude ratio of said echo signal to said desired signal.

8. A network according to claim 7, wherein the delay time introduced by said transmission line between said input and output terminals is substantially equal to the time delay of said echo signal relatively to said desired signal.

DENNIS CLARK ESPLEY.

REFERENCES CITED

The following references are of record in the file of this patent:

UNITED STATES PATENTS

| Number | Name | Date |
|---|---|---|
| 2,227,057 | Blumlein | Dec. 31, 1940 |
| 2,310,692 | Hansell | Feb. 9, 1943 |
| 2,448,635 | Smith | Sept. 7, 1948 |

FOREIGN PATENTS

| Number | Country | Date |
|---|---|---|
| 50,047 | France<br>Addition to No. 842,357 | Nov. 10, 1939 |